Aug. 5, 1958     M. STIMLER     2,845,712
TEMPLATE FOR ANALYZING MULTICHANNEL OSCILLOGRAPH DATA
Filed Aug. 13, 1954     2 Sheets-Sheet 1

*INVENTOR.*
MORTON STIMLER
BY
ATTYS

Aug. 5, 1958 M. STIMLER 2,845,712
TEMPLATE FOR ANALYZING MULTICHANNEL OSCILLOGRAPH DATA
Filed Aug. 13, 1954 2 Sheets-Sheet 2

INVENTOR.
MORTON STIMLER
BY
ATTYS

United States Patent Office 2,845,712
Patented Aug. 5, 1958

2,845,712

TEMPLATE FOR ANALYZING MULTICHANNEL OSCILLOGRAPH DATA

Morton Stimler, Silver Spring, Md.

Application August 13, 1954, Serial No. 449,813

7 Claims. (Cl. 33—1)

(Granted under Title 35, U. S. Code (1952), sec. 266)

The invention described herein may be manufactured and used by or for the Government of the United States of America for governmental purposes without the payment of any royalties thereon or therefor.

The present invention relates to a calculating device and more particularly to a template suitable for use with a six channel oscillograph for analyzing the multichannel data produced thereby.

Moreover, the invention provides a new and improved device for analyzing multichannel oscillograph data in order to determine quickly and accurately the correct phase angle and signal swing and at the same time make it possible to locate a point on one trace corresponding, in time, to a point on another trace.

Heretofore, in order to determine the proper phase relationship of the oscillograms or traces produced by a multichannel oscillograph it was necessary to use special lined recording paper which involves considerale expense.

Moreover, to perform the necessary geometrical constructions and obtain the correct results various drafting instruments were employed such, for example, as a scribing compass and at least two triangles. Furthermore, while it was possible to use unlined recording paper during such operations it necessitated the use of the aforesaid equipment to determine the starting point of the galvanometer pens and the arcs of motion of the pens and thus the time saved by the use of the unlined paper was offset by the time required to manipulate the aforesaid drafting equipment.

In accordance with the present invention a new and improved template or guide analyzing device has been devised which overcomes the objections heretofore encountered by providing a device for quickly and accurately analyzing multichannel oscillograph data without the use of special lined recording paper and the aforesaid drafting equipment.

The template of the present invention comprises essentially an elongated member or blade composed of transparent material having six arcs or curved portions corresponding to the six channels of the oscillograph and which have as their radii the effective length of the usual oscillograph pens and a common tangent line with the arc centers and zero center holes located along the perpendiculars to this tanget line at the tanget points. Thus by this arrangement the use of a compass is eliminated. Furthermore, by the aforesaid template arrangement transferring of the points could be accomplished directly with the template from one zero line to another thus eliminating the use and manipulation of the aforesaid triangles.

An object of the present invention is to provide a device suitable for use with a multichannel oscillograph for analyzing the recorded data on the recording tape thereof.

Another object of the invention is the provision of a template wherein means are provided for making quick and accurate measurements of phase displacements between a plurality of curves recorded on the tape of a multichannel oscillograph.

Still another object of the invention is the provision of a new and improved oscillograph measuring device for quickly determining the time phase and signal amplitude thereof and in which means are provided whereby points on one oscillogram trace may be quickly transferred to determine the corresponding points on another oscillogram trace.

Other objects and many of the attendant advantages of this invention will be readily appreciated as the same becomes better understood by reference to the following detailed description when considered in connection with the accompanying drawings wherein.

Figure 1:
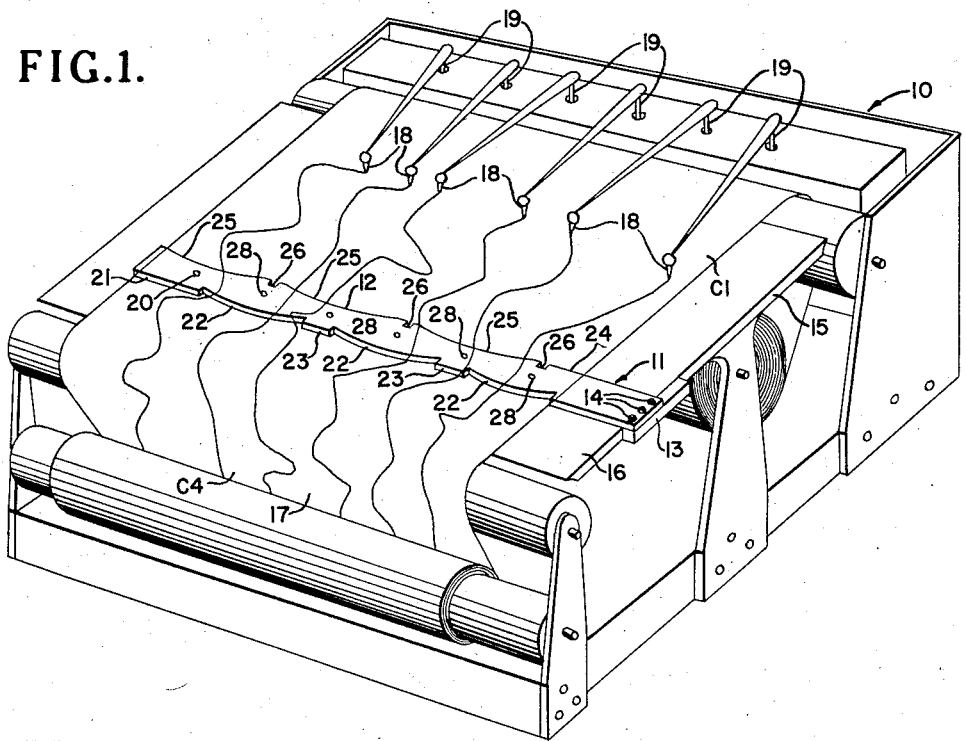
Fig. 1 is a perspective view in diagrammatical form of a six channel oscillograph illustrating the template in use.

Referring now to the drawing for a more detailed description of the novel device of the present invention for measuring and analyzing multichannel oscillograph data, the device is illustrated in Fig. 1 in connection with a six channel oscillograph 10. The device or template is generally indicated by the reference character 11 and comprises an elongated plate or strip 12 composed of any transparent material suitable for the purpose such, for example, as "Plexiglas" or "Lucite." The template is provided with a guide block 13 fixed to one end thereof as at 14 and which in operation normally engages on the side wall 15 of the oscillograph. Thus by this arrangement the template is supported on the table 16 of the oscillograph in operative reltaion with respect to the recording tape 17 and traverses the plurality of recording channels of the oscillograph. (The tape, if desired, may be removed from the recorder and analyzed on a drawing board or desk top.)

The oscillograph is provided with a plurality of recording pens 18 of the conventional galvanometer type pivotally mounted thereon as at 19 and adapted to be operated in response to an electric current.

The plate or blade 12 of the template is provided at one edge 21 thereof with three arcuate or curved portions 22 formed therein which border on a plurality of risers 23, each riser having a straight edge disposed on a line that is tangent to arcuate portions 22 at the mid point or zero thereof. In like manner the edge 24 of the template is provided with three arcuate or curved portions 25 which border on a plurality of slots 26, each slot having a straight line bottom wall in transverse alignment along a line tangent to arcuate portions 25 at the mid point or zero thereof, the template, being calibrated as at 27 adjacent each curve 22, 25 with suitable scale markings or other indicia whereby the true pen deflection may be measured. The purpose of the aforesaid arrangement will become more clearly apparent as the description proceeds.

The plate 12 of the template is further provided with a plurality of zero center holes 28, one hole being disposed adjacent each of the arcs 22 and 25 and positioned centrally with respect thereto. It will be noted on Fig. 1 that the curves 22, 25 are disposed in overlapping relation with respect to each other and correspond and coact with the six channels of the oscillograph. Furthermore, the radii of the arcs of the curves are equal to the effective length of the pens, and the zero center holes 28 function as guides for plotting the zero center lines of the pens on the recording tape during the analyzing and measuring of the desired traces recorded thereon. Moreover, by the aforesaid template arrangement it will be understood that an accurate analysis of a number of traces may be made without removing the recording tape from the oscillograph.

Figure 2:
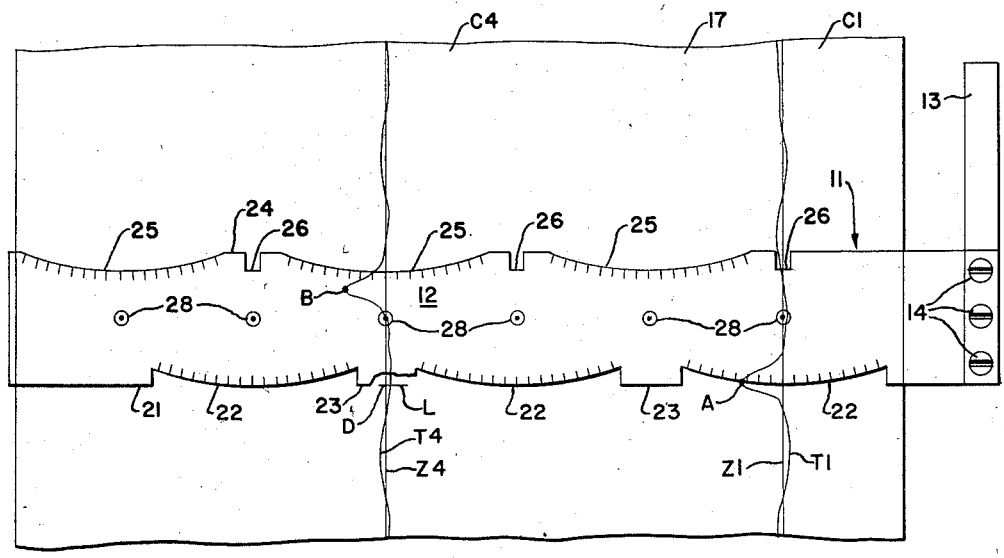
Fig. 2 is an enlarged plan view of the template of Fig. 1 in connection with points on a pair of oscillograph traces illustrating the first step in determining the time lag therebetween.

For a more complete understanding of the operation of the device of the present invention attention is directed to Fig. 2 which illustrates the first step for determining time lag between point A on trace T1 and point B on trace T4, it being understood that trace T1 is produced in channel C1 and trace T4 is produced in channel C4 of the oscillograph. By inserting a pencil in the zero center hole 28 in the template which is the zero center position in channel C1 and sliding the template along table 16 using the guide block 13 as a guiding means for the template, the zero center line Z1 of channel C1 is drawn. In like manner the zero center line Z4 of channel C4 is drawn. It will be understood that the aforesaid zero line, if extended, would pass through the center of rotation of the pens. After scribing the zero center lines Z1, Z4 on the tape 17 the template is positioned with the arc of channel C1 over point A and a line L is drawn at the transfer edge or riser 23 of channel C4, the line L intersecting the zero center line Z4 as at D. The intersecting point D represents the point at which the recording pen 18 of channel C4 would have been if the trace had been going through the zero center line thereof at that particular time. It is to be understood that the straight line bottom wall of each slot 26 serves the same purpose as the transfer edge or riser 23.

Figure 3:
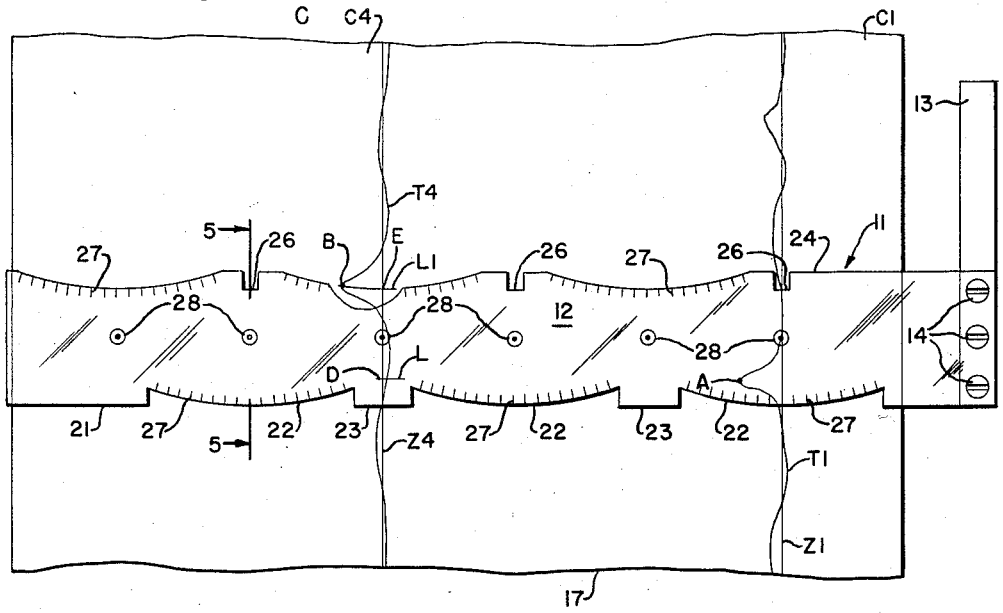
Fig. 3 is a view similar to Fig. 2 illustrating the template in a position on the traces to complete the final step in the operation of the template.
Figure 5:
Fig. 5 is an enlarged sectional view taken on the line 5—5 of Fig. 3.
Figure 4:
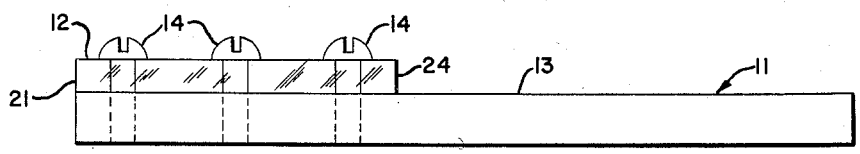
Fig. 4 is an end view of the template.

In the final step for ascertaining the time lag between points A and B the template is now moved to the position as shown on Fig. 3 with the curve of channel C4 in alignment with point B. When this has been done a line L1 is drawn which intersects the zero center line Z4 at point E. Having completed this operation the time lag between point A on trace T1 and point B on trace T4 may be ascertained by dividing the distance between the two intersecting points D and E on the zero center line Z4 of channel C4 by the speed at which the recording tape moves.

Moreover, simultaneous points on the two traces T4 and T1 may be determined in the aforesaid manner with reference to Fig. 2, point D. For example, to determine the point on trace T4 which is simultaneous with point A on trace T1, the template is moved such that the arc of channel C4 is in alignment with point D. When this has been done the arc of channel C4 may be used as a guide to scribe a line intersecting the trace T4. Thus the point of intersection is simultaneous with point A on trace T1. It will be understood, however, that in performing the aforesaid operations between two even numbered channels, or two odd numbered channels, the arcs in the template are used instead of the slots 26 and transfer elements 23. Furthermore, it will be understood, that by employing the calibrations 27 bordering on the curves 22, 25 of the template an accurate signal amplitude measurement of the peaks or any point on the traces may be made by placing the appropriate curve of the template at the desired position on the trace and reading the scale associated therewith.

From the foregoing it will be apparent that a new and improved template has been devised for use with a multichannel oscillograph wherein signal amplitude and time phase between oscillograms or recording traces may be quickly and accurately determined and the point on one trace corresponding in time to a point on another trace may be quickly ascertained without the use of the usual drafting instruments heretofore employed.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent in the United States is:

1. A device for analyzing multichannel oscillograph data, comprising an elongated blade composed of transparent material, a plurality of concave arcuate elements formed in one edge of said blade, said blade being provided with a plurality of slots bordering on said elements, there being a slot adjacent an end of each element, each slot having a straight edge disposed on a line tangent to said elements, a plurality of convex arcuate elements formed in the other edge of said blade, a plurality of transfer risers bordering on said convex arcuate elements, each riser having a straight edge disposed along a line tangent to said convex arcuate elements, and calibrating means associated with each of said arcuate elements.

2. A template of the character disclosed, comprising an elongated blade having an edge formed with a series of spaced apart concavely formed curve portions, said edge also being formed with a series of slots bordering on said curved portions, each slot having a straight line bottom wall constituting a straight edge, said straight edges of said slots being disposed in alignment along a line tangent to said curved portions.

3. A template as defined in claim 2, and further characterized in that the blade is provided with a series of guide holes, there being a guide hole associated with each curved portion and located on a line perpendicular to said tangent line at the tangent point of the associated curve portion.

4. A template as defined in claim 3, and further characterized in that said curved portions are uniformly curved about a center of curvature and the associated guide hole is on a line which is perpendicular to the tangent line and passes through the center of curvature of the associated curved portion.

5. A template of the character disclosed, comprising an elongated plate having two straight edges of unequal length, a first series of spaced apart arcuate portions formed in said blade, each of said portions being tangent to a straight line on the prolongation of the shorter straight edge of said blade, said straight line constituting a tangent line, a series of projections bordering on said arcuate portions and each projection having a straight edge on line with said tangent line, a second series of spaced apart arcuate portions formed in said blade in overlapping relation to said first series of said arcuate portions, a plurality of elements bordering on said second series of arcuate portions, each of said elements being provided with a slot having a straight bottom wall constituting a straight edge parallel to said straight edges of said blade, said straight edges of the bottom walls of the slots being disposed on a line tangent to said second series of arcuate portions, and said plate being provided with a series of openings evenly spaced along a straight line substantially midway between said series of arcuate portions, there being an opening associated with each arcuate portion midway of the length thereof.

6. A template as defined in claim 5, and further characterized in that said first series of arcuate portions are convexly formed and said second series of arcuate portions are concavely formed.

7. A device for analyzing multichannel oscillograph data, said device comprising an elongated blade generally disposed in a plane and having a pair of longitudinal edges, said blade in one of said edges being formed with a first plurality of spaced arcs and a plurality of spaced slots bordering thereon with a slot adjacent an end of each arc, said blade in the other of said edges being formed with a second plurality of spaced arcs and a plurality of transfer risers bordering thereon, each riser having a straight edge disposed along a line tangent to said second plurality of arcs, said blade being provided with a plurality of holes disposed along a line running generally midway between said edges, there being a hole opposite each arc substantially midway of the length thereof, and a guide element secured to said blade and disposed at a right angle with respect thereto, said element having a guide edge outside said plane.

References Cited in the file of this patent

UNITED STATES PATENTS

| | | |
|---|---|---|
| 177,257 | Lorenz | May 9, 1876 |
| 379,206 | Brackett | Mar. 13, 1888 |
| 1,460,103 | Lopez | June 26, 1923 |
| 1,604,232 | Lipke | Oct. 26, 1926 |
| 2,481,563 | Bevins | Sept. 13, 1949 |

OTHER REFERENCES

Page 172 of Product Engineering, January 1949.